(12) United States Patent
Otosaka

(10) Patent No.: US 10,106,451 B2
(45) Date of Patent: Oct. 23, 2018

(54) GLASS ROD MACHINING METHOD AND MACHINING APPARATUS

(71) Applicant: Shin-Etsu Chemical Co., Ltd., Tokyo (JP)

(72) Inventor: Tetsuya Otosaka, Ibaraki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 157 days.

(21) Appl. No.: 14/609,437

(22) Filed: Jan. 30, 2015

(65) Prior Publication Data

US 2015/0218031 A1    Aug. 6, 2015

(30) Foreign Application Priority Data

Jan. 31, 2014  (JP) ................................ 2014-016386
Jan. 8, 2015   (JP) ................................ 2015-002132

(51) Int. Cl.
*C03B 23/045*  (2006.01)
*G05B 19/18*   (2006.01)
(Continued)

(52) U.S. Cl.
CPC .......... *C03B 23/045* (2013.01); *C03B 23/047* (2013.01); *C03B 37/01242* (2013.01); *C03B 37/01257* (2013.01); *G05B 19/182* (2013.01)

(58) Field of Classification Search
CPC ..... C03B 23/04; C03B 23/043; C03B 23/045; C03B 23/047; C03B 23/0473; C03B 37/01257; C03B 37/01242
See application file for complete search history.

(56) References Cited

U.S. PATENT DOCUMENTS 4,799,949 A * 1/1989 Keck ................... C03B 23/0473
                                                216/33
4,948,217 A * 8/1990 Keck ................... C03B 23/0473
                                                385/141
(Continued)

FOREIGN PATENT DOCUMENTS

CN      101481208 A    7/2009
JP      H04-325428 A   11/1992
(Continued)

OTHER PUBLICATIONS

Machine translation of CN 101481208, Method of stretching glass preform bar, Jul. 15, 2009.*

(Continued)

*Primary Examiner* — Queenie S Dehghan

(57) ABSTRACT

To prevent constriction machining from reducing usage efficiency of a glass rod, provided is a glass rod machining method including softening of softening a portion of the glass rod by heating the portion of the glass rod, and constricting of forming a constricted shape in the glass rod by moving one end of the glass rod relative to the other end of the glass rod at a constriction speed satisfying a condition that a constriction load acting as a tensile force on the glass rod does not extend beyond a predetermined range. In this method, the constricting includes, when constriction speed increases, making an adjustment to decrease a heating temperature of the glass rod. This method may include determining of determining the heating temperature of the glass rod during the constricting by referencing a heating temperature table in which heating temperatures corresponding to the constriction speed are stored in advance.

12 Claims, 11 Drawing Sheets

(51) Int. Cl.
*C03B 37/012* (2006.01)
*C03B 23/047* (2006.01)

(56) References Cited

U.S. PATENT DOCUMENTS

| | | | | |
|---|---|---|---|---|
| 5,104,434 | A * | 4/1992 | Berkey | C03B 23/047 385/50 |
| 5,268,979 | A * | 12/1993 | Weidman | G02B 6/2856 385/126 |
| 5,339,372 | A * | 8/1994 | Miller | G02B 6/2856 385/29 |
| 5,968,221 | A * | 10/1999 | Blais | C03B 23/043 65/377 |
| 6,178,778 | B1 * | 1/2001 | Kenmochi | C03B 23/047 65/381 |
| 6,678,348 | B1 * | 1/2004 | Kumakhov | B82Y 10/00 378/84 |
| 6,963,072 | B2 * | 11/2005 | Kumakhov | B82Y 10/00 250/505.1 |
| 7,468,148 | B2 * | 12/2008 | Borrelli | C03B 23/047 252/500 |
| 7,510,989 | B2 * | 3/2009 | Borrelli | C03B 23/047 501/19 |
| 7,648,656 | B2 * | 1/2010 | Borrelli | C03B 23/047 252/514 |
| 7,886,561 | B2 * | 2/2011 | Kawasaki | C03B 23/047 65/381 |
| 2003/0209677 | A1 * | 11/2003 | Kumakhov | B82Y 10/00 250/505.1 |
| 2005/0172672 | A1 * | 8/2005 | Kawasaki | C03B 23/047 65/382 |
| 2007/0093373 | A1 * | 4/2007 | Borrelli | C03B 23/047 501/2 |
| 2007/0093374 | A1 * | 4/2007 | Borrelli | C03B 23/047 501/2 |
| 2009/0084137 | A1 * | 4/2009 | Borrelli | C03B 23/047 65/64 |
| 2012/0125053 | A1 | 5/2012 | Bookbinder et al. | |
| 2013/0186148 | A1 | 7/2013 | Otosaka | |

FOREIGN PATENT DOCUMENTS

| | | |
|---|---|---|
| JP | H05-024877 A | 2/1993 |
| JP | 2000-302470 A | 10/2000 |
| JP | 2006-193350 A | 7/2006 |
| JP | 2006176395 A | 7/2006 |
| JP | 2008-120643 A | 5/2008 |
| JP | 2012-218956 A | 11/2012 |

OTHER PUBLICATIONS

Office Action issued for counterpart Chinese Application 201510051508.9, issued by State Intellectual Property Office of the People's Republic of China dated Nov. 28, 2016.

Office Action issued for counterpart Japanese Application 2015-002132, issued by the Japan Patent Office dated Oct. 10, 2017.

Notice of Second Office Action for Patent Application No. 201510051508.9, issued by The State Intellectual Property Office of the People's Republic of China dated Jun. 27, 2017.

Office Action issued for counterpart Chinese Application 201510051508.9, issued by the Chinese Intellectual Property Office dated Dec. 26, 2017.

Office Action issued for counterpart Japanese Application 2015-002132, issued by the Japan Patent Office dated Mar. 13, 2018.

Office Action issued for counterpart Chinese Application 201510051508.9, issued by the Chinese Intellectual Property Office dated Jul. 5, 2018.

* cited by examiner

GLASS ROD MACHINING METHOD AND MACHINING APPARATUS

The contents of the following Japanese patent application are incorporated herein by reference:
2014-016386 filed in JP on Jan. 31, 2014; and
2015-002132 filed in JP on Jan. 8, 2015

BACKGROUND

1. Technical Field

The present invention relates to a glass rod machining method and machining apparatus.

2. Related Art

When manufacturing optical fiber, before the drawing step, there is a machining step referred to as "constricting" or "leading," which includes forming a constricted portion having a fusiform constricted portion at an end of a glass rod

PATENT DOCUMENTS

Patent Document 1: Japanese Patent Application Publication No. H5-024877

In the step of forming the constricted portion in the glass rod, there are cases where the dummy rod fractures, there is an excessive load placed on the apparatus, or there is a structural defect in the constricted portion, thereby causing a decrease in the usage efficiency of the glass rod.

SUMMARY

According to a first aspect of the present invention, provided is a glass rod machining method comprising softening of softening a portion of the glass rod by heating the portion of the glass rod, and constricting of forming a constricted shape in the glass rod by moving one end of the glass rod relative to the other end of the glass rod at a constriction speed satisfying a condition that a constriction load acting as a tensile force on the glass rod does not extend beyond a predetermined range.

According to a second aspect of the present invention, provided is a glass rod machining apparatus comprising a softening section that heats and softens a portion of the glass rod, and a constricting section that forms a constricted shape in the glass rod by moving one end of the glass rod relative to the other end of the glass rod at a constriction speed satisfying a condition that a constriction load acting as a tensile force on the glass rod does not extend beyond a predetermined range.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

First Embodiment

Figure 1:
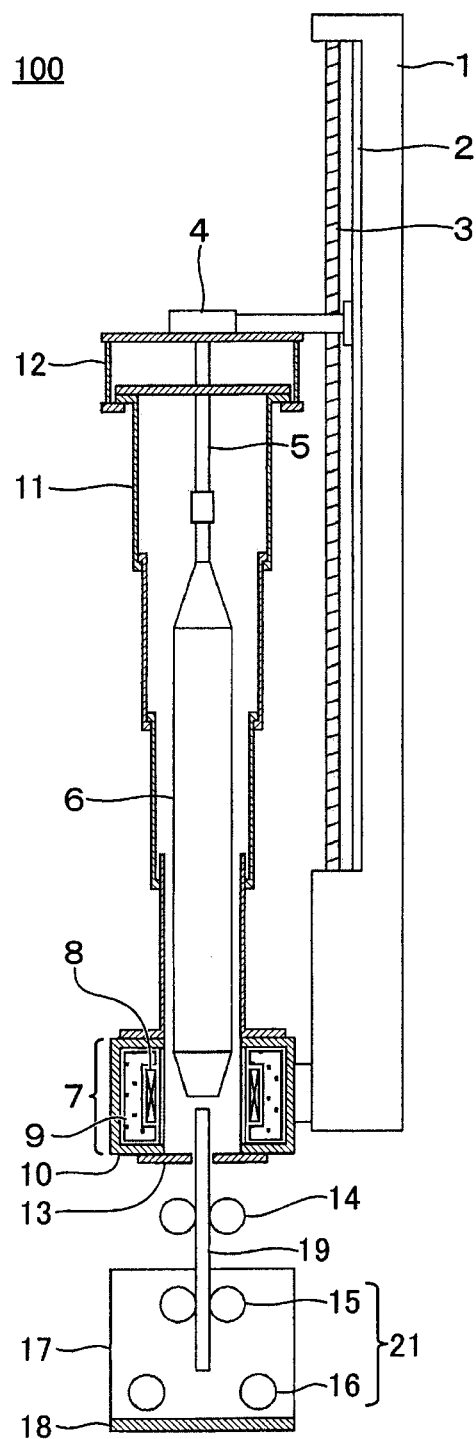
FIG. 1 is a schematic view of one step of the constriction machining using the constriction machining apparatus 100.

FIG. 1 is a schematic view of the structure of a constriction machining apparatus 100 used during the constriction machining to form the constricted portion 20 at the bottom end of a glass rod 6 and of one step of the constriction machining using this constriction machining apparatus 100. The constriction machining apparatus 100 includes a column 1, a carriage 4, a top chamber 11, a heating apparatus 7, and a stand 17.

The column 1 includes a guide rail 2 and a ball screw 3. The guide rail 2 extends in the direction of gravity, and guides the movement direction of the carriage 4. The ball screw 3 drives the carriage 4 along the guide rail 2. A hanging shaft 5 is attached to the bottom portion of the carriage 4. The glass rod 6 hangs down from the hanging shaft 5.

The heating apparatus 7 is arranged at the bottom portion of the column 1. The heating apparatus 7 shown in the drawings is formed as an electric furnace that includes a heater 8, a heat insulator 9, a furnace body 10, and also electrodes that supply power to the heater 8, for example. Instead of the heater 8, a gas burner or the like may be used as the heat source for the heating apparatus 7.

In a case where the material used for the heater 8, the heat insulator 9, and the like is carbon, the furnace material experiences wear when atmospheric gas is mixed into the furnace. Accordingly, at least the inside of the furnace body 10 is made to be an inert gas atmosphere. With the constriction machining apparatus 100 shown in the drawings, in order to prevent atmosphere from entering through the top of the furnace body 10, a top chamber 11 that covers the glass rod 6 is attached to the carriage 4, with a top chamber hanging mechanism 12 interposed therebetween. Furthermore, in order to prevent atmospheric gas from entering through the bottom of the furnace body 10, a shutter 13 that adjusts the diameter of the opening in the bottom surface of the furnace body 10 is attached to the bottom portion of the heating apparatus 7.

The stand 17 is arranged below the heating apparatus 7. The stand 17 includes guide rollers 14, a pulling section 21, and a load cell 18. The guide rollers 14 include two or more rollers that open and close freely to release or grip the pulling dummy 19 or the glass rod 6. When the pulling dummy 19 or the like is gripped, the guide rollers 14 rotate freely according to the raising and lowering of the pulling dummy 19. By gripping the pulling dummy 19 or the like, the guide rollers 14 determine the position of the pulling dummy 19 and the glass rod 6 connected to the pulling dummy 19, in the horizontal direction in the drawings.

The pulling section 21 includes upper pulling rollers 15 and lower pulling rollers 16. The upper pulling rollers 15 and the lower pulling rollers 16 each include two or more rollers that open and close freely to release or grip at least one of the pulling dummy 19 and the glass rod 6. In this way, in a case where the outer diameters of the glass rod 6 and the pulling dummy 19 are not continuous, for example, the plurality of pulling rollers can be used separately to continuously control the pulling speed of the glass rod 6. Furthermore, by arranging the plurality of pulling rollers in the pulling direction of the glass rod 6, the overall pulling section 21 can continue to control the pulling speed from end to end of the glass rod 6 over a long period from when the pulling of the glass rod 6 begins to when the pulling ends.

The upper pulling rollers 15 and the lower pulling rollers 16 are each rotationally driven by a motor or the like, and function to set the position of the gripped pulling dummy 19 or glass rod 6 in the horizontal direction in the drawings and to move the pulling dummy 19 or the glass rod 6 in the vertical direction in the drawings. In the following description, the term "pulling section 21" refers to at least one set of the upper pulling rollers 15 and the lower pulling rollers 16.

The load cell 18 is connected to the bottom of the stand 17 in the drawings, supports the stand 17 from below, and measures the positive and negative loads acting on the stand 17. The load measurement value acquired by the load cell 18 has the tare weight subtracted therefrom, such that the load measurement value is zero when nothing is being gripped by the pulling section 21. Accordingly, when at least one of the carriage 4 and the pulling section 21 raises or lowers the glass rod 6, the load placed on the pulling dummy 19 and the glass rod 6 can be measured. Furthermore, when at least one of the carriage 4 and the pulling section 21 is driven to form the constricted portion in the glass rod 6, the constriction load acting on the glass rod 6 can be calculated based on the measurement value from the load cell 18 and the weight of the glass rod 6 located below the heating apparatus 7.

When the glass rod 6 is to be used as an optical fiber preform, there is an ineffective portion in the end portion of the glass rod 6 that cannot be used as optical fiber. This ineffective portion is removed via thermal cutting, prior to the drawing step. Furthermore, the constriction machining causes a fusiform constricted portion to be formed at the end of the effective portion of the glass rod 6. As a result, the optical fiber can be smoothly drawn from the glass rod 6.

When using the constriction machining apparatus 100 to perform the constriction machining of the glass rod 6, first, the top end of the glass rod 6 is connected to the bottom end of the hanging shaft 5, and the glass rod 6 is hung within the top chamber 11. Here, the carriage 4 rises along the column 1 according to the ball screw 3, and the top chamber 11 extends in a vertical direction in the drawings. Furthermore, the region of the glass rod 6 near the bottom thereof is positioned within the heater 8 of the heating apparatus 7.

Figure 2:
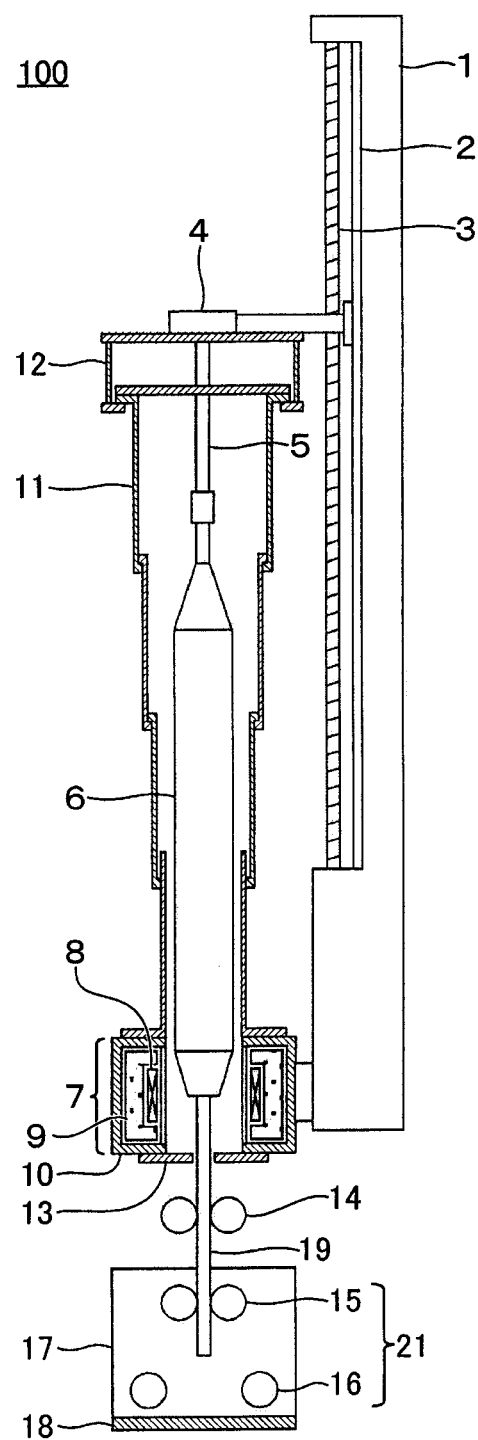
FIG. 2 is a schematic view of another step of the constriction machining using the constriction machining apparatus 100.

FIG. 2 is a schematic view of another step in the constriction machining using the constriction machining apparatus 100. As shown in the drawings, the pulling dummy 19 is provided in the constriction machining apparatus 100 following the glass rod 6. The pulling dummy 19 is guided by the guide rollers 14 and driven by the pulling section 21 to enter into the heating apparatus 7 from the bottom in the drawings.

In the heating apparatus 7, the bottom end of the glass rod 6 is heated and softened by the heater 8. The top end of the pulling dummy 19 that has entered into the heating apparatus 7 contacts the bottom end of the softened glass rod 6, thereby connecting to the glass rod 6. In this way, the glass rod 6 and the pulling dummy 19 are formed integrally. In the steps up to this point, the opening of the shutter 13 has been narrowed to conform to the outer diameter of the pulling dummy 19.

Figure 3:
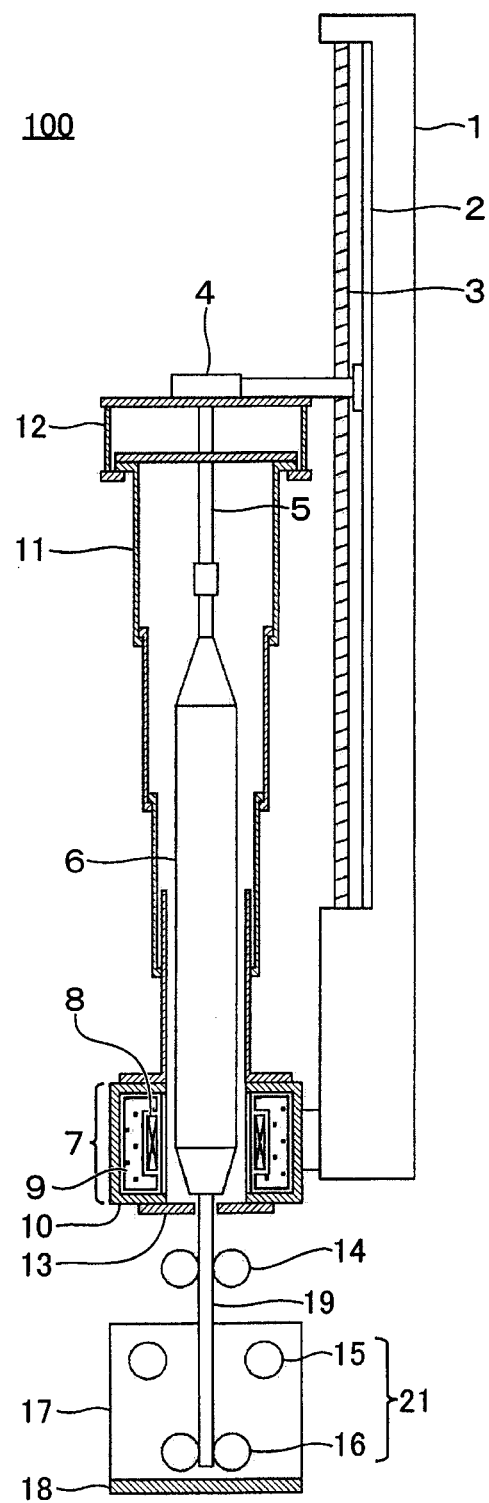
FIG. 3 is a schematic view of yet another step of the constriction machining using the constriction machining apparatus 100.

FIG. 3 is a schematic view of yet another step in the constriction machining using the constriction machining apparatus 100. Next, the carriage 4 is lowered by the ball screw 3, thereby causing the connection portion between the glass rod 6 and the pulling dummy 19 to be moved below the heater 8. In this state, by operating the heater 8, the position near the bottom end of the glass rod 6 is heated, and a portion of the glass rod 6 is partially softened to form a softened portion.

Figure 4:
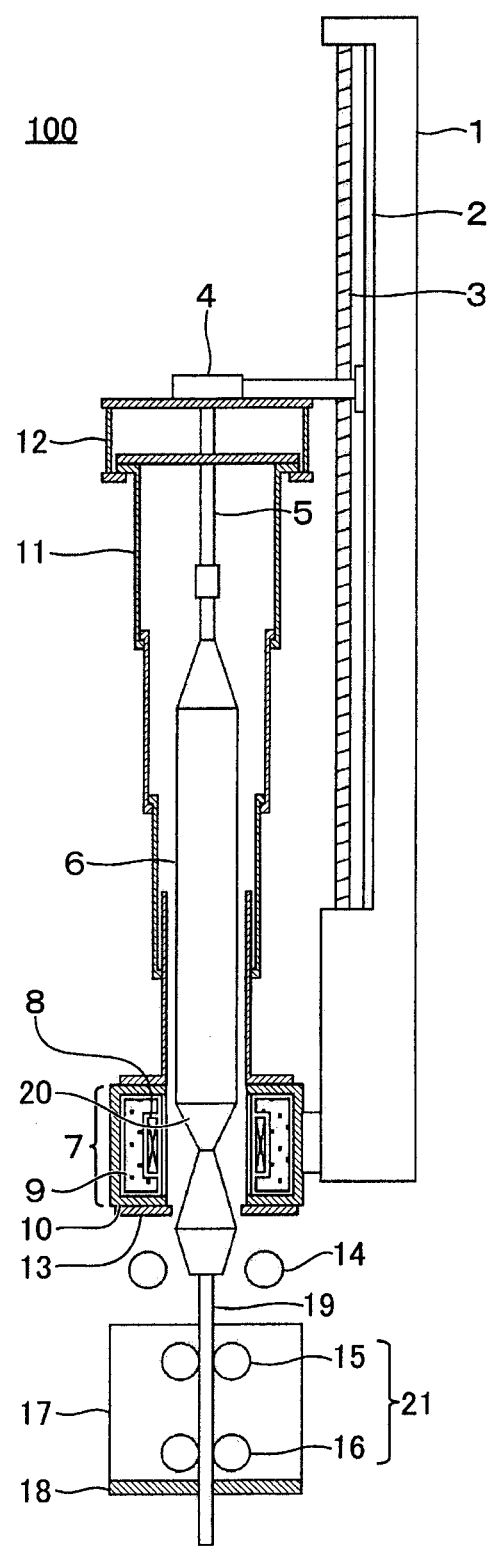
FIG. 4 is a schematic view of yet another step of the constriction machining using the constriction machining apparatus 100.

FIG. 4 is a schematic view of yet another step in the constriction machining using the constriction machining apparatus 100. Next, with the carriage 4 in a fixed state, the pulling dummy 19 is pulled by the pulling section 21, thereby causing one end of the glass rod 6 to move relative to the other end and creating a tensile force acting as the load for constricting the glass rod 6. As a result, the glass rod 6 is elongated at the softened portion that has been heated and softened by the heater 8, thereby forming the constricted portion 20 with a gradually decreasing outer diameter in the glass rod 6.

In the state where the constriction load is acting on the glass rod 6, if the constriction load is too large relative to the softness of the glass rod 6, for example, the pulling dummy 19 or the glass rod 6 gripped by the upper pulling rollers 15 or the lower pulling rollers 16 slips, which decreases the accuracy of the pulling speed control. Accordingly, the constriction load acting on the glass rod 6 may be set to be less than a constriction load at which the pulling rollers holding the glass rod 6 or the pulling dummy 19 begin to slip.

Furthermore, in the state where the constriction load is acting on the glass rod 6, if the constriction load is too small relative to the softness of the glass rod 6, for example, the softened glass rod 6 melts downward due to its own weight, regardless of the pulling rate of the pulling section 21, thereby causing curving in the constricted portion 20, abnormal shapes in the constricted portion 20, or other such phenomena. Accordingly, the constriction load acting on the glass rod 6 may be set such that the instruction value of the load cell 18 does not exceed the sum of the weight of the pulling dummy 19 and the weight of the portion at the tip that is to be removed from the constricted portion 20.

Furthermore, in the state shown in the drawing, the region at the bottom portion of the glass rod 6 extends beyond the bottom end of the heating apparatus 7 in the drawing. In order to prevent interference with the glass rod 6 in this state, the opening of the shutter 13 may be enlarged in accordance with the outer diameter of the glass rod 6.

Figure 5:
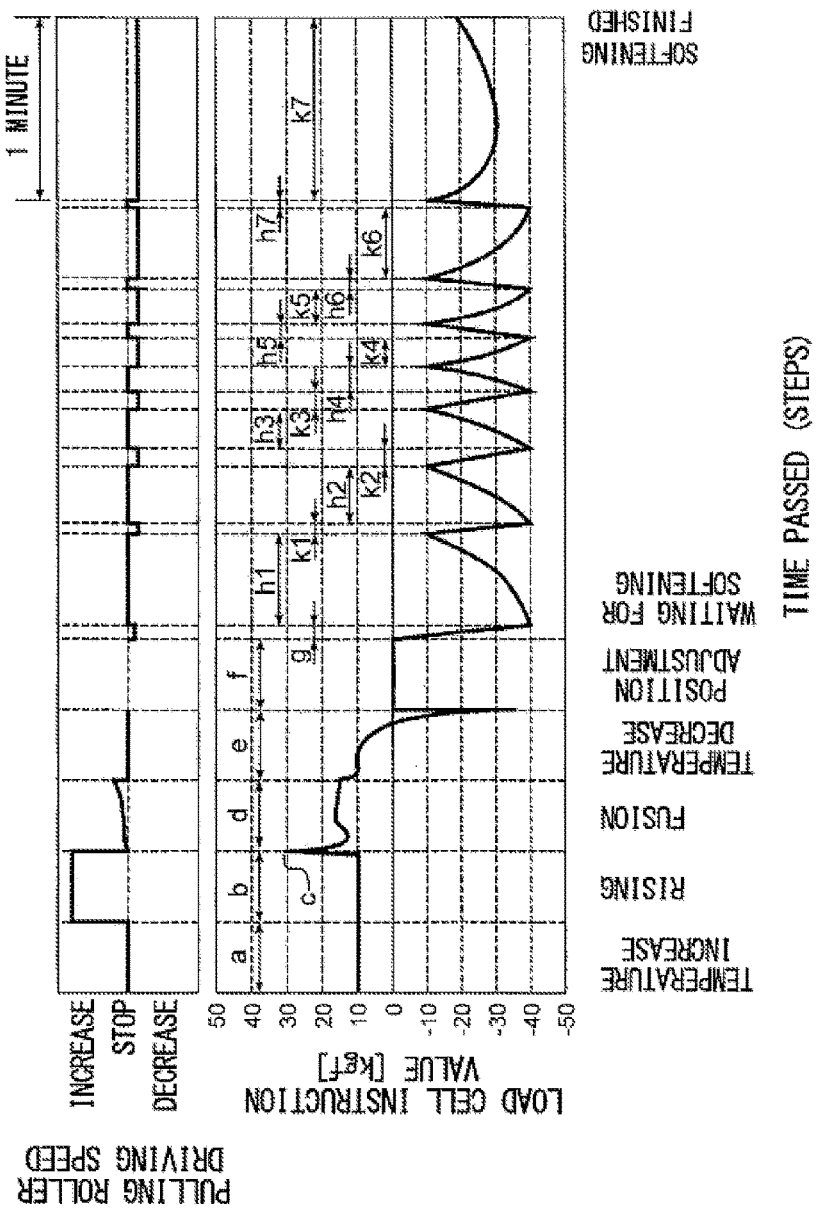
FIG. 5 is a graph showing the relationship between the driving state of the pulling section 21 and change in the instruction value of the load cell 18.

FIG. 5 is a graph showing the operation of the constriction machining apparatus 100 leading up to the start of the constriction machining described above. In the graph, the horizontal axis indicates the passage of time. In the upper portion of the graph, the vertical axis represents the movement direction and the movement speed of the pulling section 21. In the bottom portion of the graph, the vertical axis represents the instruction value of the load cell 18.

As shown in FIG. 1, at first, the bottom end of the glass rod 6 prior to connection to the pulling dummy 19 is positioned within the heating apparatus 7. On the other hand, in the stand 17 supported by the load cell 18, the pulling dummy 19 whose top end is positioned within the heating apparatus 7 is supported by the upper pulling roller 15. Accordingly, the load cell 18 indicates an instruction value corresponding to the weight of the pulling dummy 19. In the example shown in the drawings, the instruction value of the load cell 18 is 10 kgf, as shown in the region "a" in FIG. 5.

Next, in the state described above, the temperature of the heating apparatus 7 is raised to 2000° C., for example, and the bottom end of the glass rod 6 and top end of the pulling dummy 19 are softened. Next, as shown in region "b" in FIG. 5, the upper pulling rollers 15 are driven to raise the pulling dummy 19. As a result, as shown in FIG. 2, the top end of the pulling dummy 19 contacts the bottom end of the glass rod 6. At this point in time, the instruction value of the load cell 18 is greater than the weight of the pulling dummy 19, as shown by the peak at the timing "c" in FIG. 5.

After this, the raising speed of the pulling dummy 19 is adjusted such that the instruction value of the load cell 18 does not become too large. With this type of control, PID (Proportional Integral Derivative) control can be realized for the drive speed of the upper pulling rollers 15, with a target value of 15 kgf, for example, for the instruction value of the load cell 18. As another example, as shown by region "d" in FIG. 5, a raising speed pattern for the pulling dummy 19 may be prepared in advance, and the upper pulling rollers 15 may be driven to follow this raising speed pattern. Next, by stopping the raising of the pulling dummy 19 when the raising amount has reached a prescribed value, the pulling dummy 19 and the glass rod 6 are fused together, as shown in FIG. 2.

Next, the temperature of the heating apparatus 7 is lowered to 1300° C., for example, and the fused portion between the pulling dummy 19 and the glass rod 6 is hardened. At this time, the glass that has been softened hardens and also thermally contracts, and therefore the instruction value of the load cell 18 decreases, as shown in region "e" in FIG. 5.

Next, in a state where the upper pulling rollers 15 are opened to release the pulling dummy 19, the carriage 4 is lowered by the ball screw 3. As a result, the glass rod 6 and the pulling dummy 19 are lowered and, as shown in FIG. 3, the portion of the glass rod 6 that is to undergo the constriction machining is aligned with the heater 8 of the heating apparatus 7. Next, the upper pulling rollers 15 are closed to grip the pulling dummy 19 connected to the glass rod 6. During this time, as shown by region "f" in FIG. 5, the instruction value of the load cell 18 is zero.

In this way, the glass rod 6 with the pulling dummy 19 connected thereto is prepared, thereby reaching a state in which the constriction machining of the glass rod 6 can be begun. The heater 8 of the heating apparatus 7 is then operated to begin heating the glass rod 6, and the upper pulling rollers 15 are driven to move the pulling dummy 19 downward in the drawings. The driving of the upper pulling rollers 15 stops when the instruction value of the load cell 18 reaches a predetermined drive stopping threshold value, which is a value of −40 kgf in the example shown in the drawings, as shown in region "g" of FIG. 5.

When the upper pulling rollers 15 have stopped at the end of the period indicated by region "g" shown in FIG. 5, a tensile force acts on the glass rod 6. When forming the constricted portion 20 in the glass rod 6, the constriction machining is performed after heating the glass rod 6 to 2100° C., for example. However, when the temperature of the glass rod 6 has not reached the constriction processing temperature, the glass rod 6 experiences thermal expansion in a hardened state without being softened. Therefore, as shown in region "h1" in FIG. 5, the tensile force acting on the glass rod 6 is temporarily weakened and the instruction value of the load cell 18 increases.

Next, when the instruction value of the load cell 18 reaches the predetermined drive starting threshold value, which is 10 kgf in the example shown in the drawings, the upper pulling rollers 15 are again driven to move the pulling dummy 19 downward in the drawings. As shown in region "k1" in FIG. 5, the driving of the upper pulling roller 15 continues until the instruction value of the load cell 18 reaches the drive stopping threshold value described above, which is −40 kgf in the example shown in the drawings. As a result, the instruction value of the load cell 18 increases again.

After this, as shown by regions "h" to "h7" and "k2" to "k6" in FIG. 5, the operation by which the upper pulling rollers 15 are driven when the instruction value of the load cell 18 reaches the drive starting threshold value and the driving of the upper pulling rollers 15 is stopped when the instruction value of the load cell 18 reaches the drive stopping threshold value is repeated. In this way, while the driving and stopping of the upper pulling rollers 15 repeats using the instruction value of the load cell 18 as a reference, the temperature of the glass rod 6 increases and the glass rod 6 is softened.

In this way, the driving time during which the upper pulling rollers 15 lower the pulling dummy 19 becomes relatively longer, and the time during which the upper pulling rollers 15 are stopped while waiting for the glass rod 6 to elongate becomes relatively shorter. Therefore, as shown by region "k7" in FIG. 5, even when the driving time during which the upper pulling rollers 15 lower the pulling dummy 19 exceeds a predetermined threshold time, e.g. one minute, if the instruction value of the load cell 18 has not reached the drive stopping threshold value, then it is determined that the glass rod is sufficiently softened and the operation of the constriction machining apparatus 100 moves on to the constriction machining shown in FIG. 4. In this way, the constriction machining of the glass rod 6 can be begun with the constriction machining apparatus 100.

In this way, when performing constriction machining using the constriction machining apparatus 100, before placing a continuous constriction load on the glass rod 6 to perform constriction machining, a step may be added in which the pulling operation is stopped in a state where a very small pulling tensile force is acting on the glass rod, and then the softened state of the glass rod is determined by detecting a change in the constriction load. As a result, when constriction machining begins while the glass rod is not sufficiently softened, problems such as an excessive constriction load being generated due to a small pulling operation or mechanical damage such as damage to the hanging shaft 5 or hanging dummy rod can be prevented.

Figure 6:
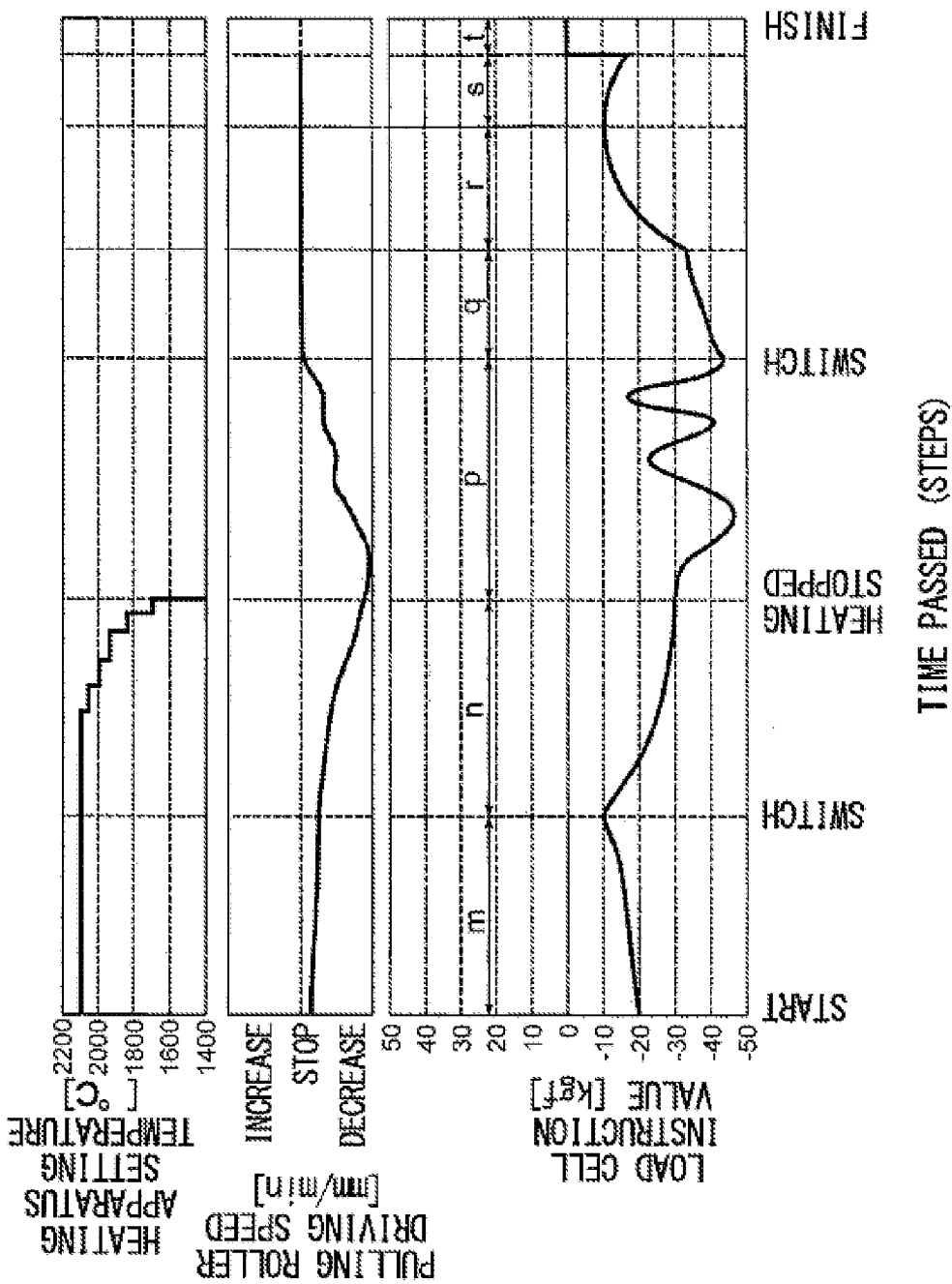
FIG. 6 is a graph showing the relationship between the driving state of the pulling section 21 and change in the instruction value of the load cell 18.

FIG. 6 is a graph showing the operation of the constriction machining apparatus 100 for performing constriction machining on the glass rod 6, and follows the steps shown in FIG. 5. The horizontal axis of this graph indicates the passage of time. In the upper portion of the graph, the vertical axis represents change in the setting temperature of the heater 8 in the heating apparatus 7. In the middle portion of the graph, the vertical axis indicates the operating direction and operating speed of the pulling section 21, including the combination of the upper pulling rollers 15 and the lower pulling rollers 16. In the lower portion of the graph, the vertical axis indicates the instruction value of the load cell 18.

When the constriction processing of the glass rod 6 with the constriction machining apparatus 100 is begun, the constriction speed, which is the movement speed of the bottom end region of the glass rod 6 and the pulling dummy 19 being driven by the pulling section 21, experiences PID control according to the target value set as the constriction load value for the glass rod 6. Here, the constriction load of the glass rod 6 can be detected as the instruction value of the load cell 18.

In this way, the constriction speed can be controlled such that the tensile force (constriction load) acting on the constricted portion 20 formed in the glass rod 6 remains substantially constant. The "constriction speed" mentioned here refers to the tugging speed on the end portion of the glass rod 6 exerted by the pulling section 21, and is also the separation speed between the ends of the glass rod 6. In this way, by controlling the constriction load acting on the glass rod 6 to be substantially constant, it is possible to prevent curving or drooping of the constricted portion 20 caused by excessive softening of the constricted portion 20.

When using PID control for the constriction speed in the constriction machining apparatus 100, the PID parameter may be changed for the initial period when the constriction machining first begins and the period during the constriction machining when a continuous constriction load is placed on the glass rod 6. During this initial period when the constriction machining begins, there are cases where the heating of the glass rod 6 is insufficient and the viscosity of the glass rod 6 is too high. In such cases, when a high-sensitivity PID parameter is used in which the constriction speed changes greatly in response to a small change in the constriction load, it is difficult to realize stable control. Accordingly, during the initial period when constriction machining is begun, by using a low-sensitivity PID parameter with a low proportional gain, such as shown in region "m" of FIG. 6, constriction machining can be realized with a stable constriction load.

Furthermore, when the glass rod 6 is sufficiently heated, the driving speed of the pulling dummy 19 is gradually increased by the pulling section 21, thereby entering the state in which the constriction machining can be performed by continuously applying the constriction load to the glass rod 6. During this period, as shown by region "n" in FIG. 6, a PID parameter with high sensitivity is used in which the proportional gain is higher than during the initial period when constriction machining is begun, thereby realizing high-precision PID control by which a larger constriction speed change is made in response to a constriction load change. In the example shown in the drawings, the driving speed of the pulling section 21 undergoes PID control such that the instruction value of the load cell remains substantially constant at 30 kgf, for example.

The timing at which the PID parameter is switched may be the timing at which the driving speed of the pulling dummy 19 due to the pulling section 21 exceeds a predetermined threshold value, for example. As another timing, the switching timing may be the timing at which the instruction value of the load cell exceeds the control value by a predetermined amount, e.g. 20 kgf, which would be when the instruction value reaches −10 kgf in the example shown in the drawings.

The PID parameter switching timing between the initial period when constriction processing begins and the period of continuous constriction machining can be set using the constriction speed of the constriction machining apparatus 100 as a reference, for example. Specifically, when performing PID control on the constriction speed according to a target value determined by the constriction load, the constriction speed increases along with the softening of the glass rod 6 due to the heating, and therefore when the constriction speed reaches the predetermined threshold value, the constriction operation can continue without excessive hunting for the control by switching the PID parameter.

Furthermore, since the glass is sufficiently softened, when the PID parameter during the constriction machining is a high-sensitivity PID parameter in which the proportional gain is stronger than when the constriction machining begins, the instruction value of the load cell is easy to stabilize. As the constriction machining progresses, the outer diameter of the heated portion of the glass rod 6 decreases, and the driving speed of the pulling section 21 increases in order to keep the instruction value of the load cell 18 constant. Here, as shown in region "n" of FIG. 6, the temperature of the heating apparatus 7 may gradually decrease according to the driving speed of the pulling section 21 to increase the viscosity of the glass, thereby preventing the driving speed of the pulling dummy 19 due to the pulling section 21 from becoming too high. In this way, the control for the length of the constricted portion 20 in the glass rod 6 is prevented from becoming complicated.

In the above constriction machining, the heating amount of the glass rod 6 may be adjusted according to the controlled constriction speed. For example, in the constriction processing, when the pulling constriction speed of one end of the glass rod 6 increases, the constriction speed can be controlled by making an adjustment to lower the heating temperature of the glass rod 6. Furthermore, when the constriction speed of the glass rod 6 decreases, the constriction speed can be increased by making an adjustment to increase the heating temperature of the glass rod 6.

The heating amount adjustment may include setting in advance a relationship between the constriction speed and the heating amount using a function or a data table, for example, and referencing the function or data table to adjust the heating amount, thereby enabling quick determination of the heating amount corresponding to the increase or decrease of the constriction speed. For example, when the heating apparatus is an electric heater, the adjustment can be made using a set temperature, current, voltage, or power value, and when the heating apparatus is a burner, the adjustment can be made by selecting the flow rate or flow path for combustible gas or support gas. In this way, the constriction speed that increases when the diameter of the constricted portion contracts according to the progression of the constriction machining is adjusted according to the heating amount, thereby restricting the excessive increase of the constriction speed.

When performing the constriction machining to form a lead portion in the glass rod 6, if the heating near the position of the lead of the glass rod is managed according to the passage of a predetermined heating time, there are cases where the heating ability changes according to the state of the heating apparatus 7 or where there is insufficient softening of the glass rod 6 due to variation in the outer diameter of the glass rod 6. When the glass rod 6 is pulled in a state where the softening is insufficient, phenomena such as fracturing of the dummy rod, which is thinner than the glass rod 6, or damage to the constriction machining apparatus 100 may occur.

Furthermore, when the glass rod 6 is too softened, there are cases where the melted glass droops due to its own gravity, thereby causing curving in the lead portion at the tip of the constricted portion 20 in the glass rod 6. In particular, in a case where the lead portion is being formed at the top portion of the glass rod 6, when the center of the long glass rod 6 is heated and the glass rod 6 is divided into two to form lead portions at both ends, the concentricity of the lead portions is worsened due to the excessive softening.

Figure 7:
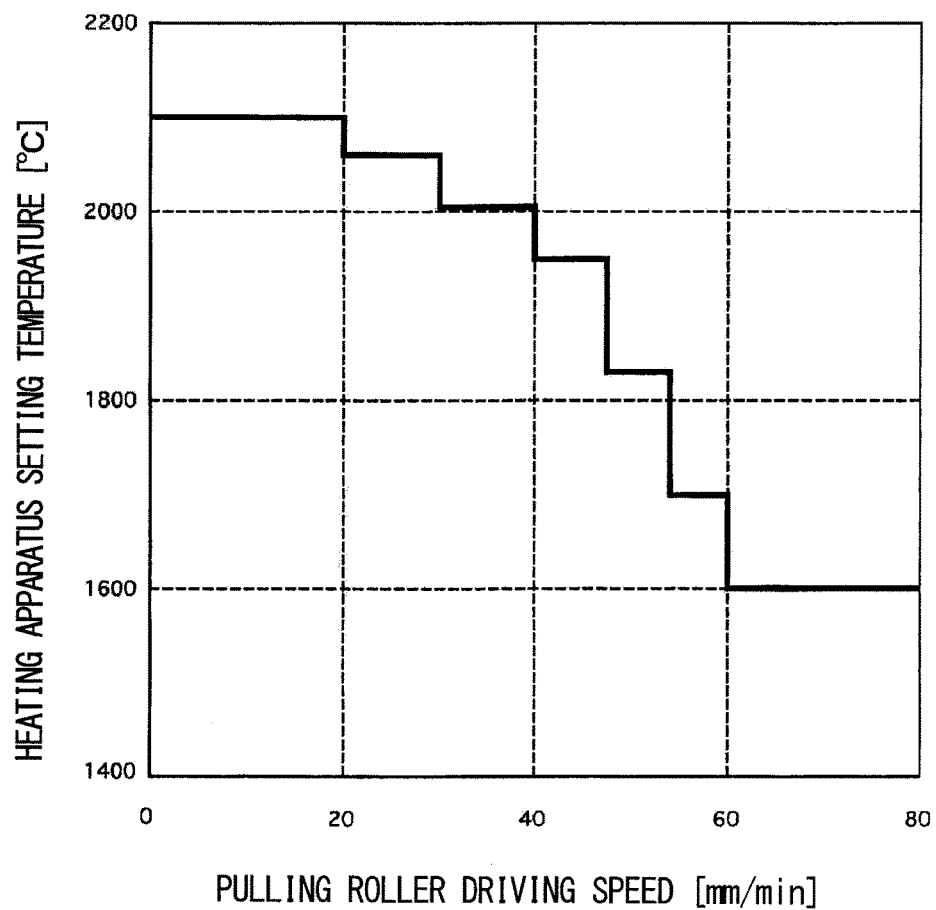
FIG. 7 is a graph showing the relationship between the setting temperature of the heating apparatus 7 and the driving speed of the pulling section 21.

FIG. 7 is a graph showing an exemplary relationship between the driving speed when the pulling dummy 19 is driven by the pulling section 21 and the heating temperature of the glass rod 6 heated by the heating apparatus 7. The relationship shown in the graph is determined in advance and recorded in a table, which is referenced when the glass rod 6 is heated by the constriction machining apparatus 100 in order to simplify the control of the heating apparatus 7. It should be noted that temperature control by the heating apparatus 7 is not absolutely necessary, and instead the temperature adjustment during the constriction machining may be omitted in a case where the desired accuracy is low relative to the length of the constricted portion 20 or where the target diameter of the constricted portion 20 is relatively large and the heating is stopped immediately after the constriction machining is begun.

With reference again to FIG. 6, during the constriction machining using the constriction machining apparatus 100, when the drawn-down length of the pulling dummy 19 reaches a prescribed value, the heating by the heating apparatus 7 may stop, as shown in region "p" of FIG. 6. At this time, the driving of the pulling dummy 19 by the pulling section 21 is not stopped, and the PID control continues using the instruction value of the load cell 18 as a target.

After the heating by the heating apparatus 7 has stopped, the temperature of the glass rod 6 decreases and the viscosity of the glass rod 6 increases. The increase in viscosity also results in large changes in the instruction value of the load cell 18 being made in response to small changes in the driving speed of the pulling rollers, and therefore the PID parameter that is used after the heating has stopped when the viscosity of the glass rod 6 has increased somewhat may be switched to a parameter that is suitable for the final portion of the constriction machining Here, the PID parameter switching timing may be the timing at which the driving speed of the pulling dummy 19 due to the pulling section 21 drops below a predetermined threshold value, for example. Furthermore, the PID parameter may be switched when the hunting cycle for the instruction value of the load cell becomes lower than a predetermined value. By switching the PID parameter set for the final portion of the constriction processing to be a low-sensitivity PID parameter with lower proportional gain than in the middle of the constriction machining, the instruction value of the load cell 18 can be stabilized, as shown in region "q" of FIG. 6.

Furthermore, the driving of the pulling section 21 is completely stopped when the temperature of the heating apparatus 7 drops to a preset temperature, e.g. 1300° C. At this time, if the glass rod 6 is not hardened, the load of the portion of the glass rod 6 positioned below the constricted portion 20 in the drawings gradually presses on the load cell 18, and therefore the instruction value of the load cell 18 temporarily increases, as shown in region "r" of FIG. 6. However, after the glass rod 6 completely hardens, the pulling section 21 is lifted up by a force resulting from the thermal contraction of the glass rod 6, and therefore the instruction value of the load cell 18 decreases, as shown in region "s" of FIG. 6.

In this way, the constriction machining of the glass rod 6 using the constriction machining apparatus 100 is completed. As described above, after confirming that the glass rod 6 has been completely hardened by the decrease in the instruction value of the load cell 18, as shown in region "t" of FIG. 6, the pulling dummy 19 is released by the pulling section 21 and then the glass rod 6 is lowered by the carriage 4, the constricted portion 20 is removed from the glass rod 6 through cutting or fusion cutting, and the glass rod product is realized.

First Manufacturing Example

Using the constriction machining apparatus 100, the constriction machining process was performed according to the steps described in FIGS. 1 to 7, thereby forming the constricted portion 20 at the end of the glass rod 6. The glass rod 6 used had an outer diameter of $\phi$ 150 mm at the trunk portion where the outer diameter is substantially constant, and the bottom end of the glass rod 6 when loaded in the constriction machining apparatus 100 had a diameter of $\phi$ 120 mm. The pulling dummy 19 connected to the glass rod 6 had a length of 2314 mm, an outer diameter of $\phi$ 50 mm, and a weight of 10 kgf. Furthermore, the top end of the pulling dummy 19 connected to the glass rod 6 was polished to have a slightly convex shape.

The fusion of the pulling dummy 19 to the glass rod 6 included, while controlling the setting temperature of the heating apparatus 7 to be 2000° C. and the instruction value of the load cell 18 to be approximately 15 kgf, raising the pulling dummy 19 by 25 mm from a position where the pulling dummy 19 contacts the glass rod 6 and then setting the setting temperature of the heating apparatus 7 to 1300° C. to harden the fused portion.

In the constriction machining apparatus 100, first, the upper pulling rollers 15 are opened and the carriage is lowered 250 mm, so that the portion of the glass rod 6 to become the constricted portion 20 is moved into the heating apparatus 7. Next, the lower pulling rollers 16 are closed to grip the pulling dummy 19. After this, the setting temperature of the heating apparatus 7 is set to 2100° C., the glass rod 6 is heated, and the pulling dummy 19 is partially softened within the heating apparatus 7.

Next, with the drive stopping threshold value according to the instruction value of the load cell 18 set as −40 kgf and the drive starting threshold value set as −10 kgf, while controlling the tensile force applied to the glass rod 6, the pulling section 21 performed intermittent drive downward at a speed of 1 mm/min and waited for the softening of the glass rod 6. When the instruction value of the load cell 18 was unable to reach the drive stopping threshold value even though the pulling dummy 19 was driven downward by the pulling section 21 for one minute, the operation of the constriction machining apparatus 100 proceeded to the constriction step. The softening waiting time, which is from when the setting temperature of the heating apparatus 7 was set to 2100° C. to when the constriction machining was begun, was 15 minutes from when the temperature of the heating apparatus 7 reached 2100° C.

During the constriction step in the constriction machining apparatus 100, the PID control of the driving speed of the pulling section 21 was performed with a target value of −30 kg with the constriction load for the instruction value of the load cell 18. The initial period when the constriction machining was begun used a PID parameter of P=350, I=15, and D=0. The PID parameter used in the middle of the constriction machining was P=150, I=15, and D=0. The setting temperature of the heating apparatus 7 in the middle of the constriction machining was determined by referencing the driving speed of the pulling section 21 and the correspondence table shown in FIG. 7.

After this, when the hung-down length of the pulling dummy reached 120 mm, the heater 8 of the heating apparatus 7 was stopped and then, while performing the constriction machining, the PID parameter for the PID control was switched from the parameter used in the middle of the constriction processing to the parameter used for the final portion of the constriction machining, at the time when the driving speed of the pulling section 21 dropped below 1 mm/min. The PID parameter for the final portion of the constriction machining was P=800, I=15, and D=0. The switching of the PID parameter from the start of the constriction machining to the middle of the constriction machining was performed when the driving speed of the pulling rollers exceeded 6 mm/min.

Figure 8:
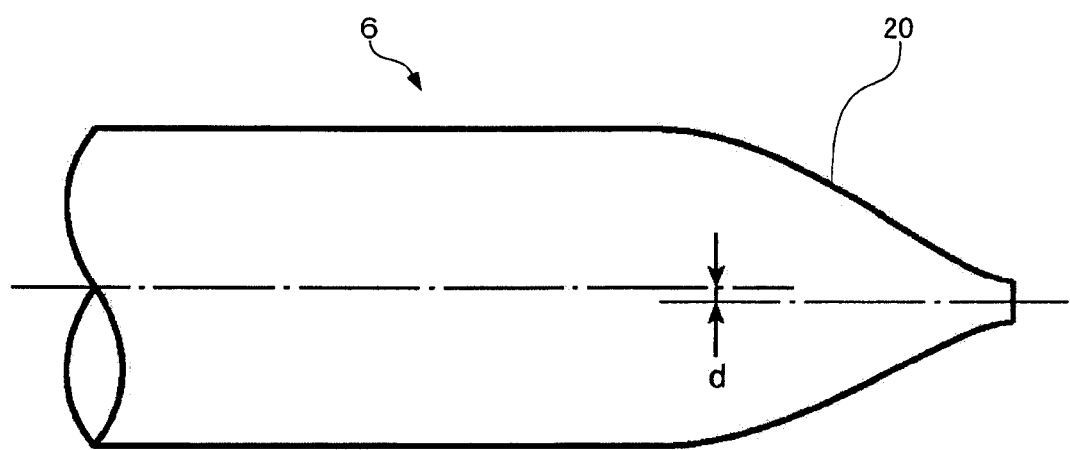
FIG. 8 is a schematic view showing the skew amount of the center line of the constricted portion.

When the glass had finally hardened, the length of the constricted portion 20 was 220 mm. Furthermore, the outer diameter of the thinnest portion of the constricted portion 20 was approximately ϕ 25 mm. The glass rod 6 was removed from the constricted portion 20 and cut with a diamond cutter at the thinnest portion of the constricted portion 20, thereby ending the constriction machining. In the obtained glass rod 6, using an index indicating the precision of the shape of the constricted portion 20, as shown in FIG. 8, the skew amount d was measured between the center line of the trunk portion of the glass rod 6 and the central line of the tip of the constricted portion 20, and this skew amount d was found to be a very low value of 0.6 mm.

First Comparative Example

Using a glass rod 6 and a pulling dummy 19 with the same specifications as in the first manufacturing example, the glass rod 6 underwent constriction machining to serve as the first comparative example. The steps up to the step of connecting the pulling dummy 19 to the glass rod 6 were performed in the same manner as in the first manufacturing example.

In the first comparative example, after the pulling dummy 19 was connected to the glass rod 6, the portion of the glass rod 6 to become the constricted portion 20 was set within the heating apparatus 7. Next, the heating apparatus 7 was heated to 2100° C., after which the glass rod 6 was heated for 25 minutes, the pulling section 21 was driven downward for 8 minutes at a speed of 20 mm/min, and then the heating was stopped. Furthermore, the driving of the pulling section 21 was stopped after continuing for three more minutes.

In this way, in the glass rod 6 where the constriction machining was managed according to processing time, the thinnest portion of the resulting constricted portion 20 had an outer diameter of approximately ϕ 25 mm. The glass rod 6 was removed from the constriction machining apparatus 100 and cut with a diamond cutter at the thinnest portion of the constricted portion 20. The skew amount was measured between the center of the cross-sectional surface formed by the cutting and the center line of the trunk portion of the glass rod 6 shown in FIG. 8, and the skew amount d relative to the center at the tip of the constricted portion 20 was found to be 1.8 mm, which is larger than the skew amount in the first manufacturing example.

Second Comparative Example

Using a glass rod 6 and a pulling dummy 19 with the same specifications as in the first manufacturing example and using the same steps as in the first manufacturing example up to the step of connecting the pulling dummy 19 to the glass rod 6, constriction machining was performed on the glass rod 6. After the pulling dummy 19 was connected to the glass rod 6, the portion of the glass rod 6 to become the constricted portion 20 was set within the heating apparatus 7 and the glass rod 6 was heated to 2100° C. After this, the glass rod 6 was heated for 15 minutes and the pulling section 21 was driven downward at a speed of 20 mm/min, at which point the fused surface between the pulling dummy 19 and the glass rod 6 peeled apart, such that the constricted portion 20 could not be formed in the glass rod 6.

Second Embodiment

Figure 9:
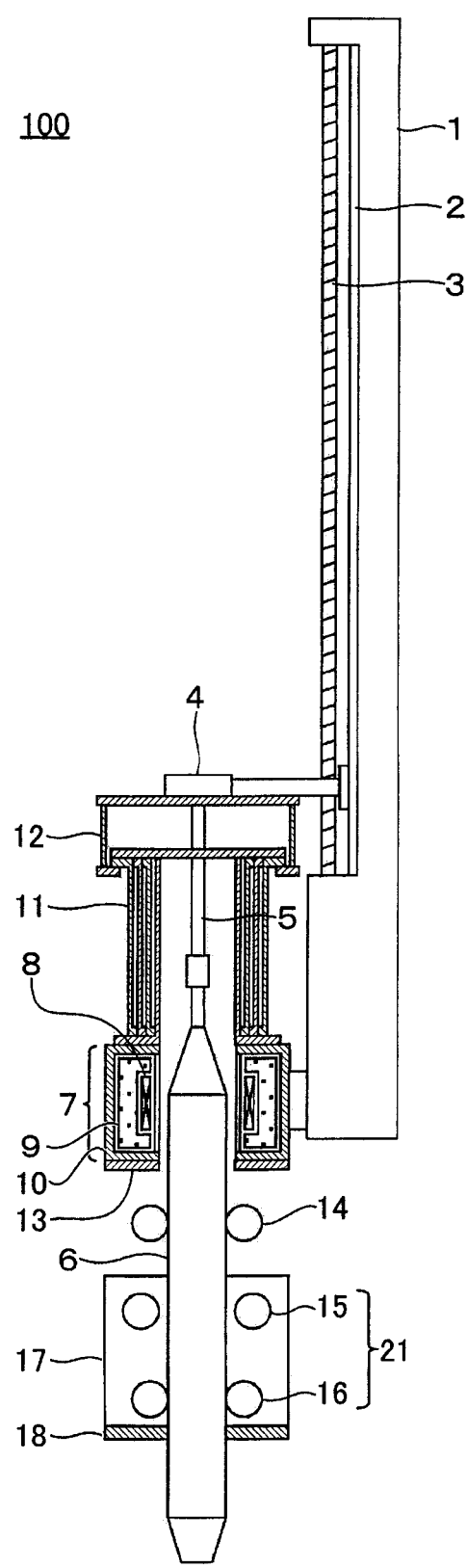
FIG. 9 is a schematic view of a step of another constriction machining process performed by the constriction machining apparatus 100.

FIG. 9 is a view describing another constriction machining method using the constriction machining apparatus 100. In this example, the glass rod 6 undergoes the constriction machining and the constricted portion 20 is formed on the top end of the glass rod 6 in the drawing.

In a case where constriction machining is performed while one end of the glass rod 6 is fixed and the other end is moved, there is a trend that the constricted portion on the side that is moved becomes longer than the constricted portion 20 formed on the side that is fixed. Therefore, when forming the constricted portion 20 on the top end of the glass rod 6 in the drawing, the trunk portion side of the glass rod 6 is fixed and the top end side of the glass rod 6 is moved to form the constricted portion 20, thereby controlling the length of the constricted portion 20.

First, in the constriction machining apparatus 100, the top end of the glass rod 6 in the drawing is connected to the hanging shaft 5. Next, the carriage 4 is driven by the ball screw 3, and the portion of the glass rod 6 where the constricted portion 20 is to be formed is moved into the heating apparatus 7, after which the glass rod 6 is gripped by the lower pulling rollers 16 and the bottom end side of the glass rod 6 is fixed. In the method of this embodiment, the pulling dummy 19 is not used.

Next, with the carriage 4 and the lower pulling rollers 16 in a fixed state, the heating apparatus 7 is operated to heat the glass rod 6. By intermittently exerting tensile force on the glass rod 6 using the carriage 4 or the pulling section 21, it is possible to check whether sufficient softening of the glass rod 6 has been achieved by the heating, as described in reference to FIG. 5.

Figure 10:
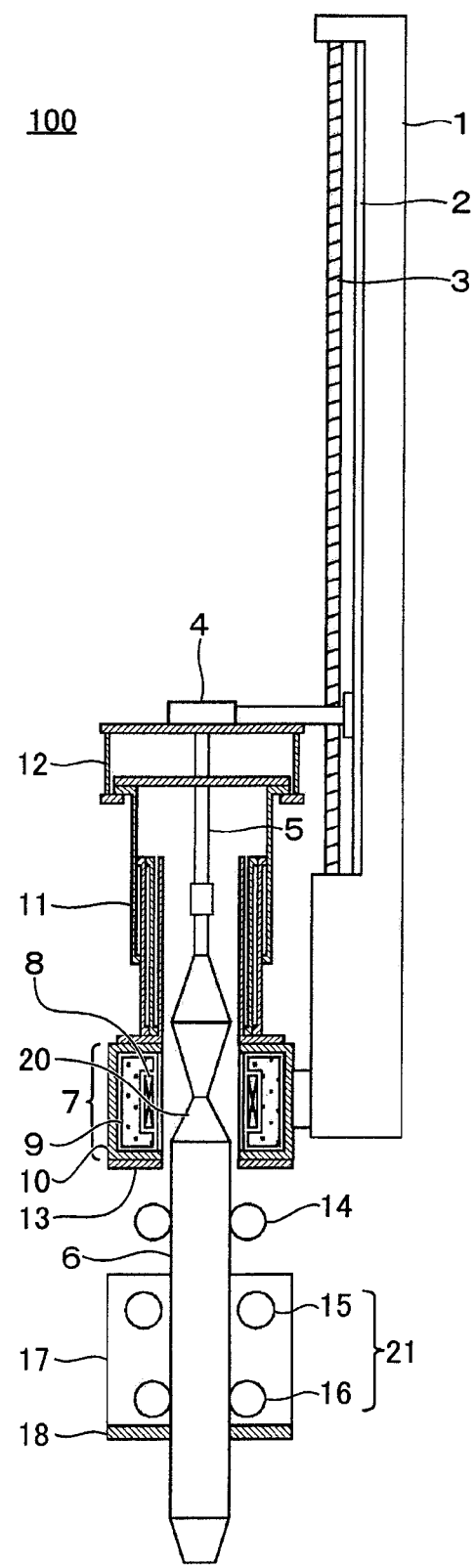
FIG. 10 is a schematic view of another step of this other constriction machining process performed by the constriction machining apparatus 100.

Next, the constriction processing is begun to form the constricted portion 20 in the glass rod 6 that has been softened by the heating. FIG. 10 is a schematic view of a constriction machining step performed on the glass rod 6 by the constriction machining apparatus 100. In this constriction machining step, a tensile force is applied to the glass rod 6 by driving the carriage 4 or the pulling section 21. In the present embodiment, the tensile force is applied to the glass rod 6 by raising the carriage 4, thereby enabling formation of the constricted portion 20 in the glass rod 6.

With the method described above, the step of fusing the pulling dummy 19 to the glass rod 6 can be omitted. Therefore, the time needed for the constriction machining can be decreased and the cost of the pulling dummy 19 can be avoided. Accordingly, when a hanging dummy is not needed for the product, it is beneficial in terms of cost and production.

In the example described above, the pulling section 21 is fixed and the carriage 4 is driven to apply the constriction load to the glass rod 6. However, it is also possible to drive the pulling section 21 to apply the constriction load to the glass rod 6. Furthermore, it is possible to drive both the carriage 4 and the pulling section 21 to apply the constriction load to the glass rod 6, while adjusting the heating position of the heating apparatus 7.

Furthermore, in a case where a single glass rod 6 is divided in the length direction to form respective constricted portions 20, for example, the carriage 4 and the pulling section 21 operate simultaneously, such that the top and bottom ends of the glass rod 6 both move away from the position of the division. In this way, each glass rod 6 resulting from the division has a short constricted portion 20 formed thereon. The glass rod 6 having a short constricted portion 20 formed in this manner can be drawn even with a drawing machine having a short stroke, and is therefore easy to use.

Figure 11:
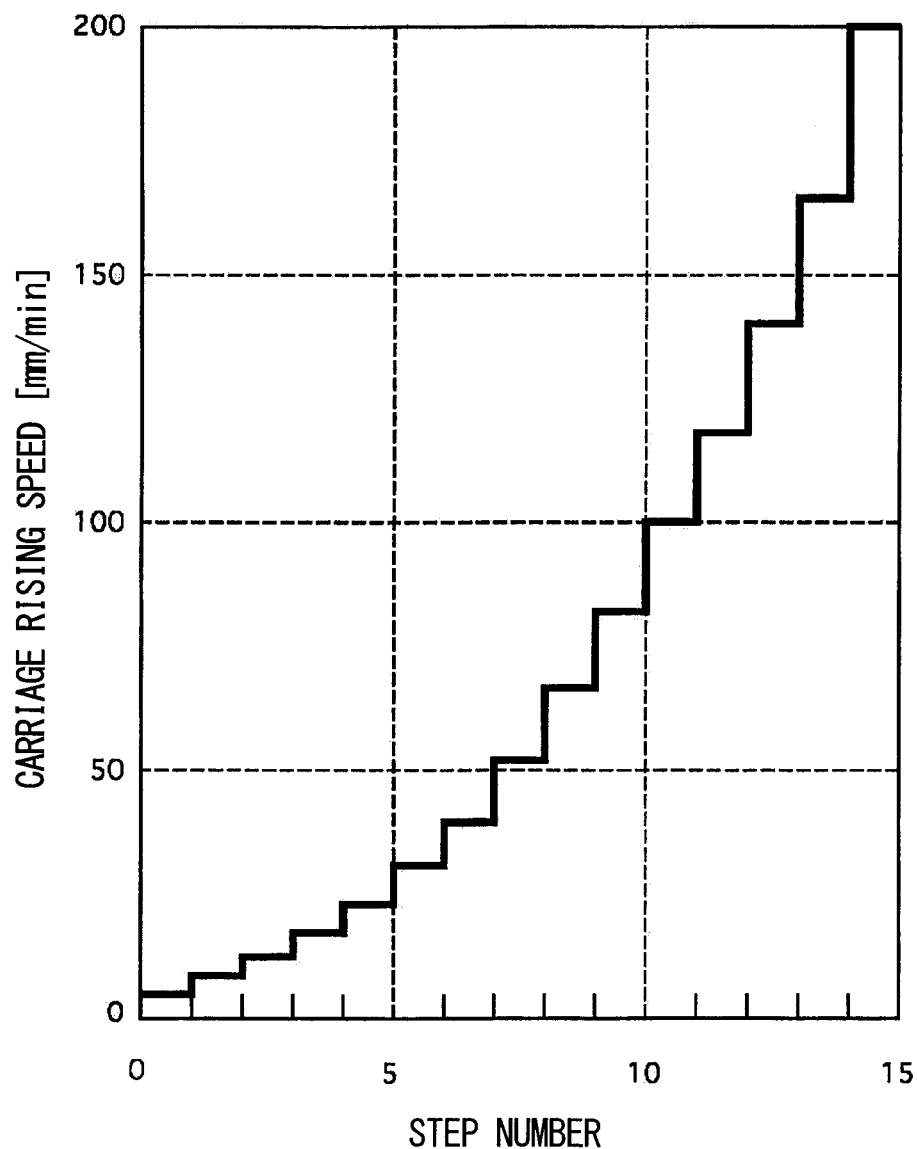
FIG. 11 is a graph showing the relationship between the rising speed of the carriage 4 and the step number.

With the method described above, the rising speed of the carriage 4 may be step-controlled, as described below. FIG. 11 is a graph showing a relationship between the step numbers and the rising speed of the carriage 4 referenced when performing step control of the rising speed of the carriage 4 in the constriction machining step.

When step-controlling the rising speed of the carriage 4, a low speed side threshold value and a high speed side threshold value are set for the rising speed of the control target, with respect to the constriction load of the glass rod 6. In the present embodiment, the low speed side threshold value is −40 kgf and the high speed side threshold value is −10 kgf.

When controlling the rising speed, first, the carriage 4 is raised at the carriage rising speed corresponding to the initial step number, and the instruction value of the load cell 18 is read. Here, if the instruction value of the load cell 18 exceeds the high speed side threshold value described above, the step number is increased by one in the graph shown in FIG. 11. As a result, the rising speed of the carriage 4 increases. On the other hand, if the instruction value of the load cell 18 is below the low speed side threshold value when the carriage 4 is raised, the step number decreases by one in the graph shown in FIG. 11. As a result, the rising speed of the carriage 4 decreases.

With the step control described above, the fluctuation of the instruction value of the load cell, i.e. the constriction load that is the tensile force placed on the glass rod 6, is contained within a range between the predetermined low speed side threshold value and high speed side threshold value. Accordingly, since there is not an excessive amount of hunting, the constriction processing is prevented from placing an excessive constriction load on the glass rod 6. Furthermore, since PID adjustment totals are not needed for the operation of the constriction machining apparatus 100, the equipment cost is decreased.

With the method described above, the arrangement of the load cell 18 is not limited to being below the stand 17. For example, the load cell 18 may be attached to the carriage 4 and the constriction load placed on the glass rod 6 may be detected by measuring the load placed on the hanging shaft 5. As another example, even when forming the constricted portion 20 on the top end of the glass rod 6 as described above, the rising speed of the carriage 4 may obviously be PID-controlled with the instruction value of the load cell 18 as a target, in the same manner as described in the first embodiment.

Second Manufacturing Example

Using the constriction machining apparatus 100, the constricted portion 20 was formed on the top end of the glass rod 6 according to the steps of the second embodiment described with reference to FIGS. 9 to 11. The glass rod 6 used in the constriction machining had a trunk portion with an outer diameter of ϕ 180 mm.

First, in the constriction machining apparatus 100, the glass rod 6 was connected to the bottom end of the hanging shaft 5. Next, the carriage 4 was lowered by the ball screw 3, the portion of the glass rod 6 to become the constricted portion 20 was moved into the heating apparatus 7, and the glass rod 6 was heated to the setting temperature of 2100° C.

Next, with the drive stopping threshold value according to the instruction value of the load cell 18 set as −40 kgf and the drive starting threshold value set as −10 kgf, while controlling the tensile force applied to the glass rod 6, the pulling section 21 performed intermittent drive to move the carriage 4 upward at a speed of 1 mm/min and waited for the softening of the glass rod 6. Finally, when the drive stopping threshold value was unable to be reached even though the carriage 4 was driven upward for one minute, the operation of the constriction machining apparatus 100 proceeded to the constriction step. The softening waiting time, which is from when the setting temperature of the heating apparatus 7 was reached to when the constriction machining was begun, was 19 minutes.

During the constriction machining step, the low speed constriction load threshold value was set to −40 kgf, the high speed constriction load threshold value was set to −10 kgf, and the rising speed of the carriage 4 was determined according to the step number shown in FIG. 11 and the rising speed of the carriage 4. Beginning from the carriage rising speed of the initial step number, the step number was then increased by one when the instruction value of the load cell 18 exceeds the high speed constriction load threshold value, thereby increasing the rising speed of the carriage 4. Furthermore, the step number was decreased by one when the instruction value of the load cell 18 dropped below the low speed constriction load threshold value, thereby decreasing the rising speed of the carriage 4. In this way, the fluctuation of the instruction value of the load cell 18 was kept in a range from −10 kgf to −40 kgf.

When the softening of the glass rod 6 progressed and the rising amount of the carriage 4 exceeded 60 mm, the heating apparatus 7 is stopped. However, it should be noted that while managing the constriction speed based on the instruction value of the load cell 18, the driving of the carriage 4 by the ball screw 3 continued. The rising speed of the carriage 4 was gradually decreased according to the decrease in the temperature of the glass rod 6. Finally, the rising of the carriage 4 stopped when the rising amount of the carriage 4 reached 105 mm.

In the glass rod 6 manufactured in this manner, the outer diameter of the constricted portion 20 was approximately ϕ 50 mm. The glass rod 6 was removed from the constriction machining apparatus 100, the thinnest portion of the constricted portion 20 was cut with a diamond cutter, and the skew amount d of the center line of the tip of the constricted portion from the center line of the glass rod was measured using the method described in FIG. 8 and found to be a very low value of 0.3 mm.

Third Comparative Example

Constriction machining was performed on a glass rod 6 having the same specifications as described in the second manufacturing example to manufacture the third comparative example in which the constricted portion 20 is formed. The steps up to the beginning of the constriction machining were performed in the same manner as in the second manufacturing example.

In the third comparative example, the portion of the glass rod 6 to become the constricted portion 20 was set within the heating apparatus 7 and heated to 2100° C., after which heating was performed for 40 minutes, the carriage was driven upward for 4 minutes at a speed of 15 mm/min, and the heating was stopped. Furthermore, driving of the carriage continued for 3 more minutes and was then stopped. The outer diameter of the constricted portion 20 formed in the glass rod 6 was approximately ϕ 50 mm, but the constricted portion 20 buckled and bent to form a < shape. The glass rod 6 was removed from the constriction machining apparatus 100 and the thinnest portion of the constricted portion 20 was cut with a diamond cutter, after which the skew amount d of the center line of the tip of the constricted portion 20 from the center line of the glass rod was measured using the method described in FIG. 8 and found to be a value of 25 mm.

In the manner described above, it is understood that when performing constriction machining on the glass rod 6, by controlling the constriction speed such that the tensile force (constriction load) acting on the constricted portion 20 formed in the glass rod 6 is substantially constant, the skew amount d of the center line and the curving of the constricted portion 20 can be restricted. Furthermore, damage to the pulling dummy 19, the hanging shaft 5, the hanging dummy, and the like caused by insufficient heating of the glass rod 6 can be prevented. Accordingly, the glass rod 6 in which the constricted portion 20 is formed with high precision can be stably manufactured. The method described above can be applied to glass rods manufactured using a variety of methods such as MCVD, PCVD, VAD, OVD, and rod-in-tube.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A glass rod machining method comprising:
    softening a portion of the glass rod by heating the portion of the glass rod;
    constricting to form a constricted shape in the glass rod by moving one end of the glass rod relative to the other end of the glass rod at a constriction speed satisfying a condition that a constriction load acting as a tensile force on the glass rod does not extend beyond a predetermined range,
    setting correspondence between speeds and step numbers in a stepped manner,
    setting a low speed side threshold value, representing a maximum force of the predetermined range, and a high speed side threshold value, representing a minimum force of the predetermined range, such that a step control is made in response to the constriction load reaching one of the low speed side threshold value and the high speed side threshold value, wherein
    the predetermined range of the constriction load is determined with a condition that the constriction load is less than the maximum force of the predetermined range, which is a constriction load that would cause a tool that grips and moves the glass rod to slip relative to the glass rod and that a load placed on the tool is greater than the minimum force of the predetermined range, which is a weight of a portion of the glass rod that is below the portion being softened by the heat in the direction of gravity, and
    the constricting includes performing the step control to decrease the constriction speed by reducing the current step number by one in response to the constriction load reaching the low speed side threshold value, and to increase the constriction speed by increasing the current step number by one in response to the constriction load reaching the high speed side threshold value.

2. The glass rod machining method according to claim 1, wherein
    the constricting includes making an adjustment to decrease a heating temperature of the glass rod in response to an increase in the constriction speed.

3. The glass rod machining method according to claim 1, wherein
    the constricting includes making an adjustment to increase a heating temperature of the glass rod in response to a decrease in the constriction speed.

4. The glass rod machining method according to claim 3, further comprising:
    determining the heating temperature of the glass rod during the constricting base on a correspondence between heating temperatures and the constriction speed.

5. The glass rod machining method according to claim 1, wherein
    the constricting includes PID-controlling the constriction speed with the constriction load as a target value.

6. The glass rod machining method according to claim 5, wherein
    the PID-controlling includes using a PID parameter that has lower sensitivity during a period lasting until the glass rod is softened than during a period after the glass rod is softened.

7. The glass rod machining method according to claim 6, wherein
    the using the PID parameter includes switching the PID parameter based on the constriction speed.

8. The glass rod machining method according to claim 5, wherein
    the PID-controlling includes using a PID parameter that has lower sensitivity during a period after heating of the glass rod is finished than during a period when the heating of the glass rod continues.

9. The glass rod machining method according to claim 8, wherein
the using the PID parameter includes switching the PID parameter based on the constriction speed.

10. The glass rod machining method according to claim 1, further comprising
measuring a time needed for the tensile force acting on the glass rod to reach a threshold tensile force stored in advance in response to one end of the glass rod moving away from the other end; and
judging that the glass rod has softened based on a time having passed and the tensile force, wherein
the constricting is performed in response to judging that the glass rod has softened.

11. The glass rod machining method according to claim 10, wherein the constricting is performed in response to one minute having passed without the tensile force reaching 40 kgf.

12. The glass rod machining method according to claim 1, wherein the low speed side threshold value is 40 kgf and the high speed side threshold value is 10 kgf.

* * * * *